United States Patent [19]
Jeffery et al.

[11] Patent Number: 5,290,502
[45] Date of Patent: Mar. 1, 1994

[54] METHOD OF MAKING A RIGIDIZED FIBER FILTER ELEMENT

[75] Inventors: Andrew B. Jeffery, North Quincy; George Bakis, West Roxbury; John Skelton, Sharon, all of Mass.

[73] Assignee: Albany International Corp., Albany, N.Y.

[21] Appl. No.: 951,170

[22] Filed: Sep. 25, 1992

[51] Int. Cl.⁵ .............................. B01D 39/16
[52] U.S. Cl. .................... 264/324; 55/528; 210/507; 210/508; 264/342 R; 264/DIG. 19; 264/DIG. 48; 264/DIG. 71; 264/122
[58] Field of Search .............. 264/109, 122, 123, 103, 264/324, 342 R, 234, 345, DIG. 48, DIG. 52, DIG. 71, DIG. 19; 55/527, 528, 529, DIG. 43, DIG. 45; 210/503, 505, 507, 508

[56] References Cited

U.S. PATENT DOCUMENTS

| | | | |
|---|---|---|---|
| 2,354,022 | 7/1944 | Hubert et al. | 210/505 |
| 2,396,712 | 3/1946 | Luttge et al. | 264/DIG. 71 |
| 3,015,367 | 1/1962 | Smith et al. | 264/122 |
| 3,246,767 | 4/1966 | Pall et al. | 210/505 |
| 3,251,475 | 5/1966 | Till et al. | 210/503 |
| 3,381,070 | 4/1968 | Sublett et al. | 264/122 |
| 4,018,862 | 4/1977 | Saito | 264/122 |
| 4,195,112 | 3/1980 | Sheard et al. | 264/122 |

FOREIGN PATENT DOCUMENTS

| | | | |
|---|---|---|---|
| 54-34475 | 3/1979 | Japan | 264/DIG. 48 |
| 58-101719 | 6/1983 | Japan | 210/505 |
| 2-104764 | 4/1990 | Japan | 264/DIG. 71 |

*Primary Examiner*—Jeffery Thurlow
*Assistant Examiner*—Mathieu Vargot
*Attorney, Agent, or Firm*—Kane, Dalsimer, Sullivan, Kurucz, Levy, Eisele and Richard

[57] ABSTRACT

A rigidized fiber filter element is produced from a precursor fiber web. The precursor fiber web contains heat-shrinkable fibers or binder fibers or both. The web is exposed to temperatures sufficiently elevated to cause shrinkage of the fibers or melting of the binder. After cooling the web, the filter elements produced are self-supporting, and may have densities up to 500 kg/m³ to improve filtration while retaining good functional characteristics for operating pressure drop and air permeability. Rigidized fiber filter elements can be constructed of one material, and thus may be suitable for recycling.

9 Claims, 2 Drawing Sheets

METHOD OF MAKING A RIGIDIZED FIBER FILTER ELEMENT

BACKGROUND OF THE INVENTION

1. Field of the Invention

The present invention relates to filter elements used to remove particulate matter from fluid streams. Specifically, the present invention is concerned with the provision of rigidized and densified fiber filters which do not require cages, rings or other fabric support hardware.

2. Description of the Prior Art

The use of filter elements made from fibers to remove particulate matter from gaseous streams is well known in the art. For example, fabric filter elements have long been deployed in bag houses, so-called because the fabric filter elements deployed therein are bag-shaped, adjacent to smoke or exhaust stacks in coal-burning electric power generating stations, to remove ash and other particulates from the exhaust gas stream before the stream as a whole exits from the stack.

It follows, of course, that periodically the filter elements must be cleaned to restore their permeabilities to some optimum value, as the particulate matter being filtered tends to accumulate on the upstream surface of a filter element, typically the outer surface of a bag-shaped configuration, reducing its permeability and the ability of the entire filter apparatus to handle the gas flow. This might be accomplished by shaking or otherwise agitating the apparatus holding the filter elements, and allowing the particulate matter to settle down on a tray or other receptacle beneath the apparatus for disposal.

Alternatively, pulses of air from a source at high pressure may be directed through the filter elements, in a direction opposite to that in which the gaseous stream being filtered normally proceeds, to dislodge the accumulated particulate matter from the filtering surfaces of the elements.

While it is necessary to clean the filter elements periodically to restore their permeabilities to desired levels, the cleaning operation itself contributes to premature fabric failure. This is often a consequence of the means used to mount the bag-shaped filter elements. Such means include cages, rings and other fabric support hardware, all usually made of metal. These rigid structures eventually cause the filter elements being flexed in a cleaning cycle to abrade and tear, producing holes requiring replacement of the filter element as a whole.

Cartridge filters are increasingly being used for industrial filtration. Cartridge filters are constructed from metal components which comprise end caps and a supporting frame and fabric or paper which forms the filter media. The number of components used in the construction and difficulty in breaking apart or compressing the elements make disposal of them difficult. The need for metal components also increases the weight of the cartridge, making handling and installation more difficult.

Accordingly, the provision of a rigidized fiber filter element, that is self-supporting and therefore does not require supporting hardware, would represent a significant advance to this field of technology. Such a fiber filter element would carry the added benefits of being readily and easily replaceable by those of a different size, in terms of length or cross-sectional area or shape, so that the filter area may be changed.

Filter elements being constructed of one material may be disposed of more easily. Lack of a supporting frame simplifies the breaking apart and compressing of the element for disposal. The element consisting solely of one material may be suitable for recycling or incineration as a means of disposal.

SUMMARY OF THE INVENTION

The present invention is a rigidized and densified fiber filter element, that is, a rigid, permeable filter element made from fibers that is suitable for use in fabric filters and cartridge filters. The rigidized fiber filter elements of the invention are self-supporting and, therefore, do not require cages, rings and other fabric support hardware. The self-supporting structure of the present filter elements results from the dense packing and bonding of its component fibers. The filter elements are readily replaceable, and can be used as original equipment in new fabric filters or as replacements in existing units.

The production of the rigidized and densified fiber filter elements of the invention requires the provision of a precursor fiber structure. The precursor may take any of a number of forms, including tubular nonwoven fabrics, flat nonwoven fabrics, woven fabrics, knitted fabrics, and fabrics produced from fibers wet or dry formed onto a mandrel of desired shape. The specific fiber deniers included in the precursor fiber structure will depend upon the ultimate application, and can be chosen to optimize the density, rigidity, filtration efficiency and flow properties desired in a rigidized and densified fiber filter element for a given application. The filter elements may comprise fibers of a synthetic polymeric resin, as well as fibers of a natural textile material, mineral or metal.

The precursor fiber structure is rigidified and densified by various methods. For example, the precursor is slipped in sleeve-like fashion onto a mandrel, and is heat-shrunk thereon. This method produces a rigidized and densified fiber filter element.

An alternate rigidification and densification method can be used to increase the surface area per unit volume of the filter element. In this method, the precursor fiber structure is slipped in sleeve-like fashion onto a frame comprising a plurality of longitudinal supports. Mold segments may be used to engage the precursor simultaneously between each pair of the plurality of longitudinal supports. The entire assembly of precursor, frame and mold segments is then subjected to high temperature, causing the precursor to shrink and form the desired shape.

In still another method, the precursor web is placed between inner and outer shaping devices, which can heat and compress the web to produce a denser structure upon heat-shrinking.

The rigidized and densified fiber filter elements of the present invention have densities which cannot be achieved in normal textile processing methods. In the prior art, densities for filter elements are typically between 200 kg/m$^3$ and 300 kg/m$^3$. Depending on the fiber diameter, this may seriously limit the filtration efficiency. The filter elements of the present invention can have densities up to 500 kg/m$^3$. At such a level, filtration efficiency may be improved without sacrificing good functional characteristics for operating pressure drop and air permeability.

The rigidized and densified fiber filter elements of the present invention may also contain other material such as particles or powders which can chemically react with, act as catalysts for, or deliver material to, the fluids passing therethrough. While ordinarily those fluids will be gaseous, the present filter elements may also be used in wet filtration applications, where the fluids may be liquids.

The present invention will now be described in more complete detail below, with frequent reference being made to the accompanying figures identified below.

DETAILED DESCRIPTION OF THE PREFERRED EMBODIMENT

As described above, the present invention is a rigidized and densified fiber filter element, which is self-supporting, and which may be rigidified and densified by various methods.

All methods require the provision of a precursor fiber structure. The precursor may take any of a number of forms, including tubular nonwoven fabrics, flat nonwoven fabrics, woven fabrics, knitted fabrics, and fabrics produced from fibers wet or dry formed onto a mandrel of desired shape. As noted above, a range of fiber deniers can be used to optimize the density, rigidity, filtration efficiency and flow properties of the elements for each application.

Figure 1:
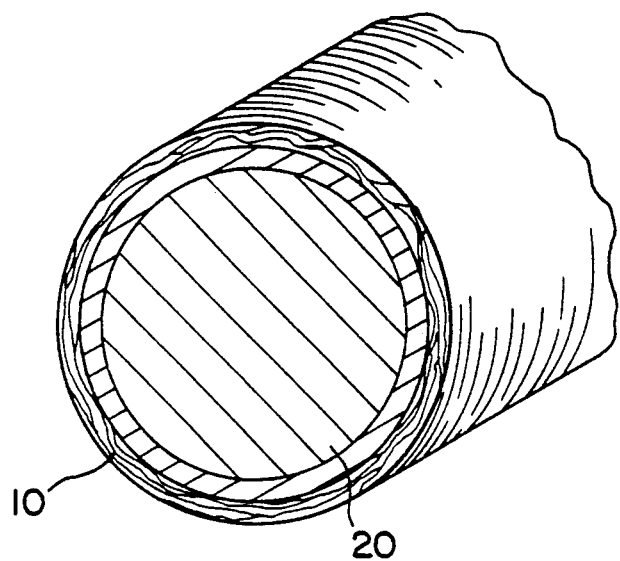
FIG. 1 shows a precursor tubular web positioned over a mandrel prior to being shrunk thereon.

A method is illustrated in FIG. 1. A precursor tubular web 10 is manufactured slightly oversized so that it can be positioned over a mandrel 20 of suitable cross-sectional shape. The precursor tubular web 10 and mandrel 20 are then exposed to an appropriate high temperature environment. The web 10 shrinks and thereby is brought into intimate contact with the mandrel 20. While contact with the mandrel 20 prevents further shrinking so as to reduce further the diameter of the web 10, continued exposure to high temperature gives rise to circumferential tensions that lead to a through-the-thickness compression of the web 10. This, in turn, leads to a consolidation of the web 10 which provides the filter element with the rigidity desired.

The degree of web consolidation accompanying shrinkage, the extent to which a density gradient exists across the rigidized structure, and the quality of the surface finish can be controlled by manipulating the density of the precursor tubular web 10, by modifying the relative diameters of the precursor tubular web 10 and the mandrel 20, and by the thermal treatment protocol to which the web 10 and mandrel 20 are exposed during the rigidification process.

Figure 2:
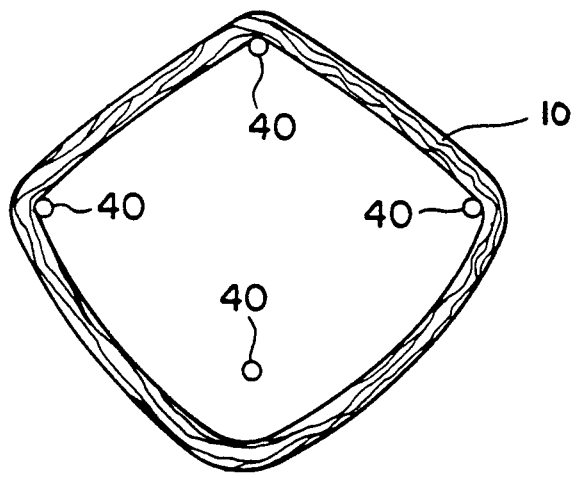
FIG. 2 shows a precursor tubular web positioned around a support cage.

A second method for producing the rigidized and densified fiber filter element of the present invention provides it with both an increased surface area and a more rigid structure when compared to that produced by the method previously described. According to the second method, a precursor tubular web 10 is slipped around a support frame comprising a plurality of longitudinal supports. As shown in FIG. 2, the plurality consists of four longitudinal rods 40.

Figure 3:
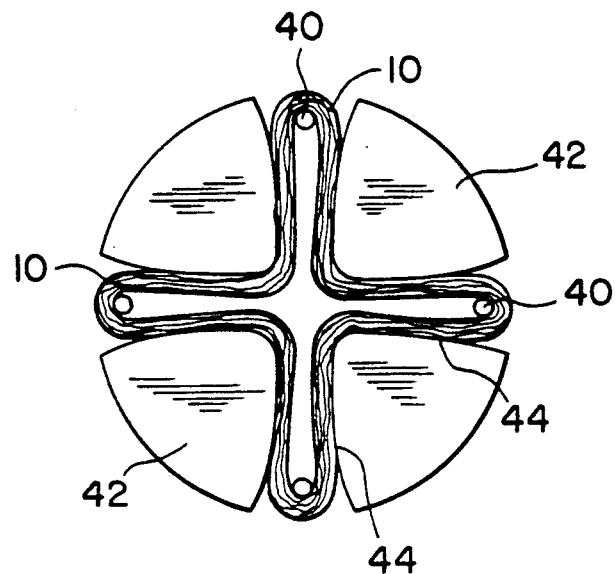
FIG. 3 shows a precursor tubular web on a support cage with external mold segments in position.

Next, a plurality of mold segments, each generally taking the form of a longitudinal wedge-shaped slice or a cylinder, engage the precursor tubular web 10 simultaneously between each pair of the plurality of longitudinal rods. In FIG. 3, four such mold segments 42 are shown, one being inserted between each pair of longitudinal rods 40. The generally radial smooth surfaces 44 of these mold segments 42 can be flat (planar) or curved (convex) or of other more complex shapes. While flat surfaces are easier to machine, convex surfaces will guarantee good interfacial contact between the outside surface of the precursor tubular web 10 and the surfaces 44 of the mold segments 42.

When the entire assembly of precursor tubular web 10, longitudinal rods 40, and mold segments 42 is subjected to high temperature, the precursor tubular web 10, as before, will shrink and, in so doing, will result in a rigidized and densified fiber filter element. The number of mold segments used may be varied to provide the appropriate surface area and stiffness characteristics.

The cylindrical mandrel and multi-segment external mold configurations both lend themselves to continuous production processes, using the equivalent of a pultrusion die. The heated die could be shaped to provide a transition from the cylindrical precursor, made in continuous form using a Dilo needle loom, to the required final shape, and the external surface finish would be even better in this manifestation as a result of the relative motion between the part and the die.

Figure 4:
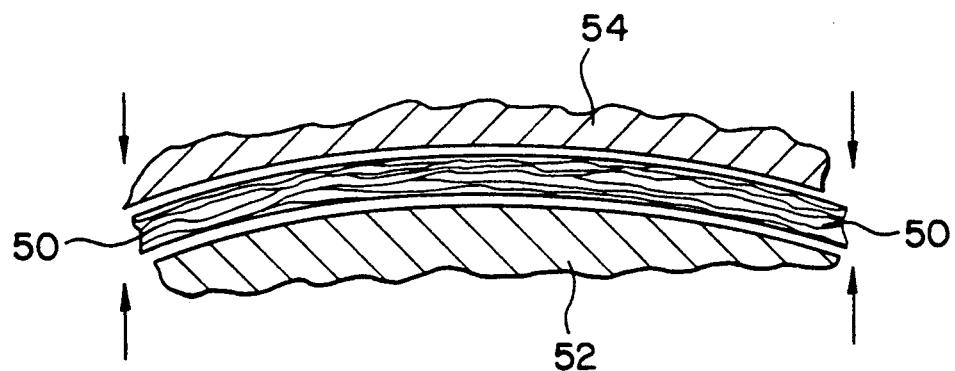
FIG. 4 shows a precursor web placed between inner and outer shaping devices.

According to yet another method, a precursor web 50, which may or may not be tubular, is placed between an inner shaping device 52 and an outer shaping device 54, which, when brought together, as suggested by the arrows in FIG. 4, may heat and compress the web to produce a denser web upon heat-shrinking.

With any method of making the rigidized fiber filter element of the present invention, surface treatments and finishes may be applied to the filter element after the rigidification process.

The fibers used to produce the rigidized and densified fiber filter element of the present invention may be of more than one variety. For example, a rigid permeable structure may be prepared from a mixture of high-shrink polyester fiber and a polyester binder fiber. The rigidity of the structure is due not only to the high-shrink fiber, but also to the binder fiber. Heating and cooling of the precursor fabric structure results in shrinkage and bonding at fiber crossover points. This further rigidifies the structure compared to that composed solely of high-shrink fiber. The density and rigidity of the fiber structure can also be increased by compression during heating.

The rigidized and densified fiber filter elements of the present invention have been made into rigid permeable structures of a range of densities and void volumes. The low-density precursor webs could include particulate matter within their web structure. A precursor web containing such particles could be rigidified and densified in accordance with any one of the process described above, and the resulting reduction in void size would confine the particles within the rigidized and densified fiber filter element. For example, particles of activated carbon could be incorporated within the filter element to remove toxic gases. Alternatively, the incorporation of catalyst particles could permit desired chemical reactions to occur in the fluids passing through the filter element.

A description of several examples of the rigidized and densified fiber filter elements is set forth below.

EXAMPLE 1

A precursor needled nonwoven comprising 50% high shrink polyester fiber and 50% bicomponent polyester binder fiber is secured by clamping the periphery against movement. The restrained structure was heated at 120° C., allowed to cool, and released. The resulting self-supporting structure had increased in density from a starting value of 170 kg/m$^3$ to 225 kg/m$^3$.

EXAMPLE 2

A precursor hydroentangled nonwoven of the same composition as in Example 1 was secured and heated as in Example 1. The resulting self-supporting structure had increased in density from a starting value of 250 kg/m$^3$ to 300 kg/m$^3$.

EXAMPLE 3

The same nonwoven as was described in Example 1 was restrained between two flat sheets, heated to 120° C., allowed to cool and released. The resulting self-supporting rigid structure had increased in density from a starting value of 170 kg/m$^3$ to 440 kg/m$^3$.

EXAMPLE 4

A tubular nonwoven comprising 100% polyimide fiber was heated to 315° C. and allowed to shrink onto a cylindrical mandrel. After the structure was cooled and removed, it was self-supporting and rigid. The density of the structure was found to have increased from 120 kg/m$^3$ to 290 kg/m$^3$. Experimental filtration trials resulted in a very high filtration efficiency of 99.990% as compared to conventional filter bags with efficiencies of 99.90%.

It should be readily understood that modifications to the above would be obvious to anyone skilled in the art without departing from the scope of the appended claims.

What is claimed is:

1. A method for producing a rigidized and densified fiber filter element for filtering fluid streams comprising the steps of:
    providing a precursor fiber web, said precursor fiber web including heat-shrinkable fibers and binder fibers;
    placing said precursor fiber web on a forming device;
    exposing said precursor fiber web and said forming device to a temperature sufficiently elevated to cause said heat-shrinkable fibers to shrink and said binder fibers to soften and to melt;
    cooling said fiber web and aid forming device to ambient temperature; and
    removing said fiber web from said forming device, said fiber web having become the rigidized and densified fiber filter element.

2. A method as claimed is claim 1 wherein said precursor fiber web includes fibers of a synthetic polymeric resin.

3. A method as claimed is claim 1 wherein said precursor fiber web includes particulate matter of a chemical substance for interaction with the fluid stream to be passed through said rigidized and densified fiber filter element.

4. A method as claimed is claim 1 wherein said forming device is a cylindrical mandrel.

5. A method as claimed is claim 1 wherein said forming device includes a support frame having a plurality of longitudinal rods, said longitudinal rods being arranged circumferetially around an open volume and being spaced relative to one another, each longitudinal rod thereby being one of an adjacent pair of longitudinal rods with those on either side thereof, said precursor fiber web being placed on said support frame, said forming device further having a plurality of mold segments, each of said mold segments being a wedge-shaped member, said mold segments being insertable between each adjacent pair of said plurality of longitudinal rods.

6. A method as claimed is claim 1 wherein said forming device includes a support frame having a plurality of longitudinal rods, said longitudinal rods being arranged circumferetially around an open volume and being spaced relative to one another, each longitudinal rod thereby being one of an adjacent pair of longitudinal rods with those on either side thereof, said precursor fiber web being placed on said support frame, said forming device further having a plurality of mold segments, each of said mold segments being a cylinder, said mold segment being insertable between each adjacent pair of said plurality of longitudinal rods.

7. A method as claimed is claim 1 wherein said forming device includes an inner shaping device and an outer shaping device, said precursor fiber web being placed between said inner and outer shaping devices, said inner shaping device and said outer shaping device being brought together to compress said precursor fiber web when said precursor fiber web and said forming device are exposed to elevated temperature.

8. A method as claimed in claim 1 wherein said forming device allows the precursor web to be constrained longitudinally.

9. A method as claimed is claim 1 wherein said forming device allows the precursor web to be constrained laterally.

* * * * *